United States Patent [19]
Jensen

[11] 4,434,529
[45] Mar. 6, 1984

[54] SAUSAGE DIAMETER MONITORING APPARATUS AND METHOD

[75] Inventor: Ronald W. Jensen, Chicago, Ill.

[73] Assignee: Oscar Mayer Foods Corporation, Madison, Wis.

[21] Appl. No.: 310,776

[22] Filed: Oct. 13, 1981

[51] Int. Cl.³ .............................................. A22C 11/00
[52] U.S. Cl. ........................................ 17/49; 17/1 F; 17/33
[58] Field of Search .................. 17/33, 34, 35, 49, 41, 17/42, 1 F; 53/504, 508

[56] References Cited

U.S. PATENT DOCUMENTS

| | | | |
|---|---|---|---|
| 2,583,791 | 1/1952 | Neff | 33/147 |
| 2,627,119 | 2/1953 | Graham | 33/172 |
| 2,631,272 | 3/1953 | Smith . | |
| 2,761,216 | 9/1956 | Gollub . | |
| 2,999,270 | 9/1961 | Knapp | 17/35 |
| 3,148,408 | 9/1964 | Good | 17/35 |
| 3,317,950 | 5/1967 | Ziolko | 17/49 |
| 4,044,426 | 8/1977 | Kupcikeviciw et al. | 17/49 |
| 4,064,634 | 12/1977 | Davis | 33/147 L |
| 4,271,699 | 6/1981 | Williamson | 73/159 |
| 4,322,871 | 4/1982 | Townsend et al. | 17/49 X |

Primary Examiner—Willie G. Abercrombie
Attorney, Agent, or Firm—Lockwood, Dewey, Alex & Cummings

[57] ABSTRACT

A method and apparatus are disclosed for monitoring the diameter of sausages and providing a visual display of the diameters. A sausage contact means is mounted along a conveyor which carries the sausages from the stuffing apparatus. The sausage contact means monitors the diameter of the sausages moving along the conveyor, and any difference between these diameters and a selected standard diameter is displayed on a statistical analyzer visible to the operator of the stuffing apparatus.

17 Claims, 6 Drawing Figures

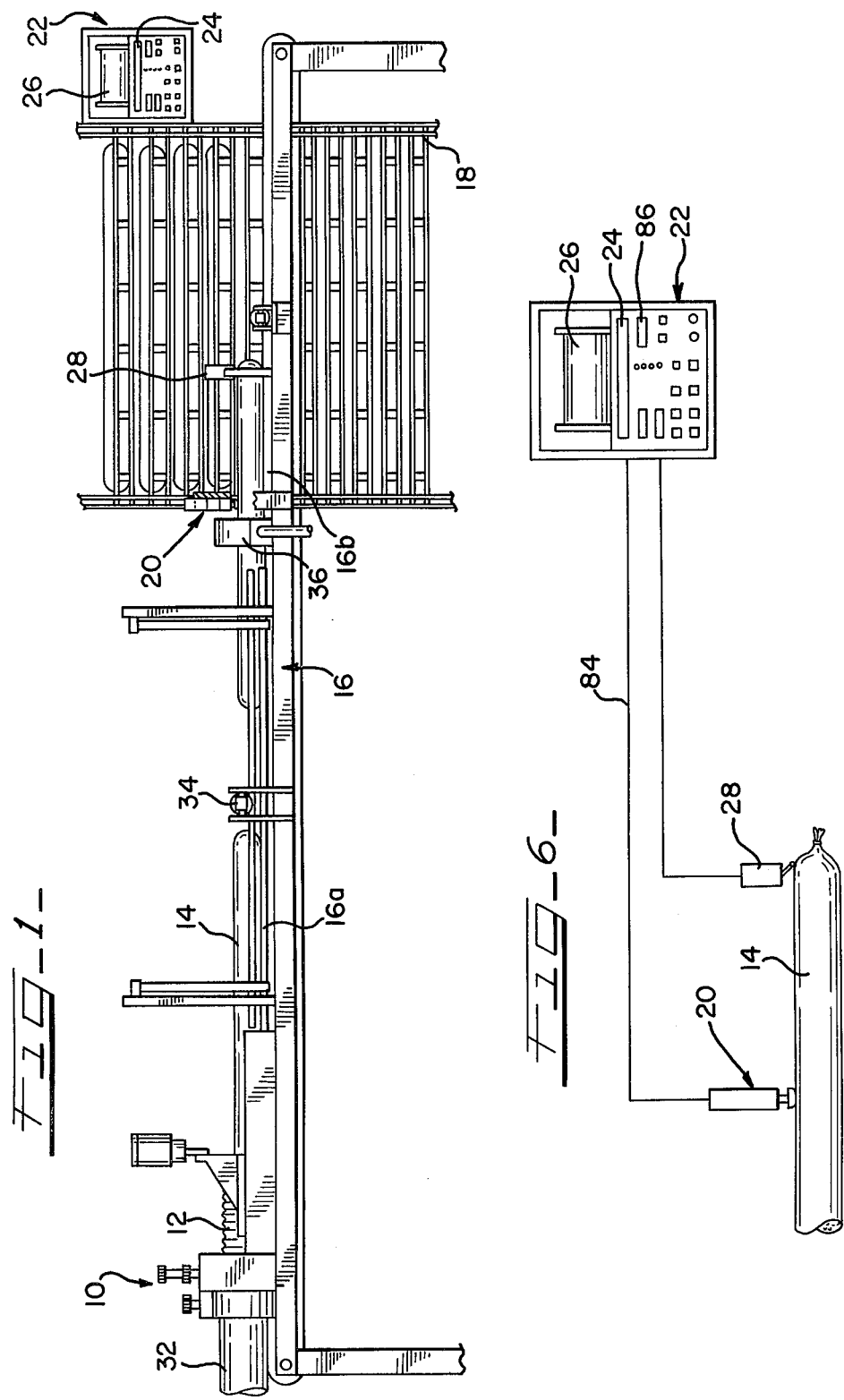

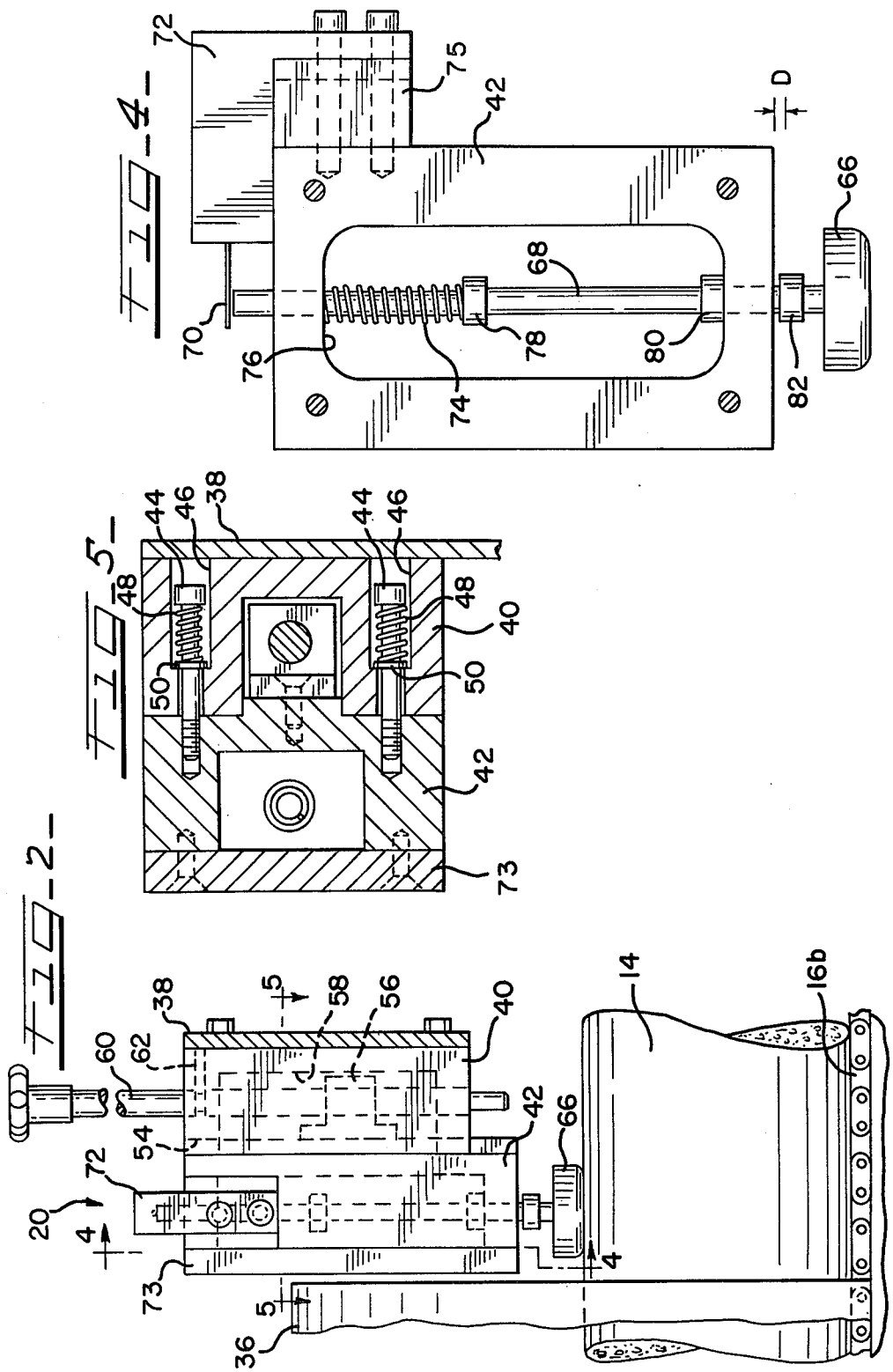

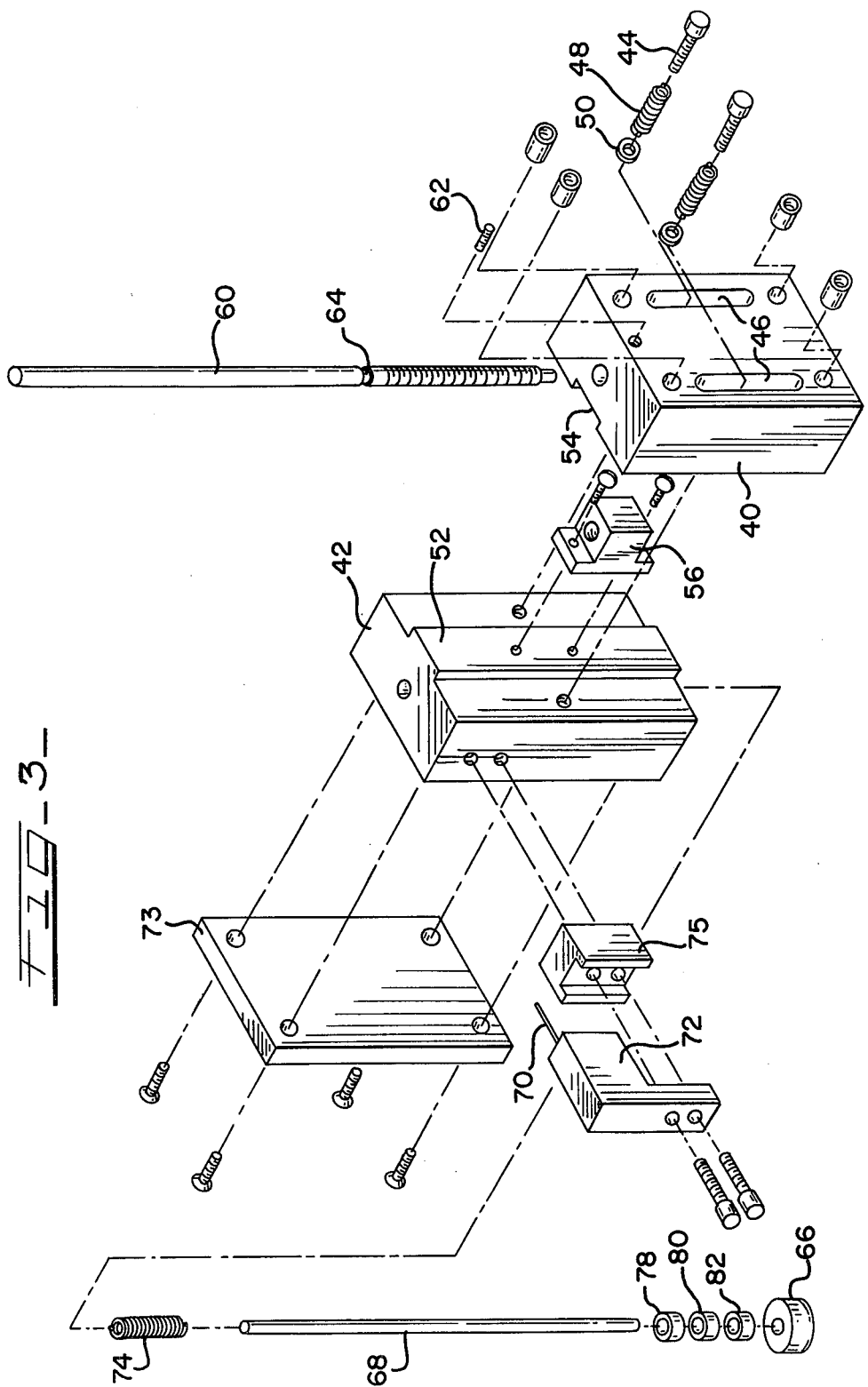

SAUSAGE DIAMETER MONITORING APPARATUS AND METHOD

This present invention generally relates to sausage-making methods and apparatus. More particularly, the present invention relates to a method and apparatus for monitoring the diameter of stuffed sausages and providing a visual display of these diameters.

The techniques and apparatus employed for stuffing large sausages are well known in the meat industry. Typically, the open end of a casing is fitted over a stuffing horn, and the sausage mixture of comminuted or chopped meat, together with selected spices and flavorings, is forced through the stuffing horn into the casing. The discharge of the mixture into the casing fills that portion which is directly in front of the stuffing horn and simultaneously acts to move the casing from the stuffing horn. Frictional retention of the casing on the stuffing horn (as by clamps, hand pressure, internal gripping fingers, etc.) controls the stuffing pressure and the amount of sausage mixture in the stuffed casing and, accordingly, the diameter of the stuffed casing.

In many instances, the diameter of the sausage is not critical, and any sausage is acceptable if the sausage diameter falls within a relatively wide tolerance. However, in certain instances (such as packaging in close-fitting cavities in preformed, rigid plastic containers) the sausage diameter must be held within relatively close tolerances for the slices to fit within the cavities.

In the past, mechanical devices analoguous to the linkage of a weighing scale have occasionally been used to monitor the diameter of sausages during stuffing. However, such devices have been of limited success for various reasons.

Accordingly, an object of the present invention is to provide an improved method and apparatus for monitoring the diameter of sausages.

Another object of this invention is to provide a method and apparatus for monitoring the diameter of sausages during stuffing so that adjustments may be made to correct for diameter variations (based on a standerd diameter).

A further object of the present invention is to provide a method and apparatus for recording the differences in the sausage diameters from a selected standard diameter to provide a record from which certain sausages may be selected for various uses.

These and other objects of this invention will be apparent from the following description and drawings.

In this application, the term "monitoring" refers to measuring or gauging.

The present invention provides a precisely adjustable sausage contact means which monitors the diameter of each sausage as the sausage moves along a conveyor carrying the sausage away from the stuffing apparatus. The sausage contact means is operatively connected to a statistical analyzer which provides a visual numerical display of the amount by which the diameter of the sausage differs from the preferred diameter. The display is mounted so as to be visible to the operator of the stuffing apparatus, so that immediate corrective measures can be taken to reduce the number of sausages which are out of tolerance. To further alert the operator of the sausage stuffing equipment that sausages are being stuffed out of the preferred diameter range, an alarm condition (such as a light or buzzer) may be used to signal the operator to make an immediate adjustment at the stuffing horn.

A printer may be used with the statistical analyzer to record the sausage diameters to provide a production record. In the preferred embodiment, this is accomplished by providing a switch downstream of the sausage contact means. When the end of a sausage engages the switch, the statistical analyzer is triggered to print the diameter reading which is being displayed at that time.

In the illustrated embodiment which will be discussed later, the distance between the switch and the sausage contact means is about one-half the length of a sausage. Thus, the printer records any difference in diameter at approximately the middle of the sausage. Also, this diameter may be printed for only selected sausages, e.g., every third, fourth or fifth sausage. From this production record, those sausages falling within the acceptable range of diameters can be selected for various uses. Accordingly, production delays and waste associated with excessive production of out-of-tolerance sausages can be minimized.

These and other objects of the present invention are set forth in the following description of the preferred embodiment as depicted in the attached drawings, of which:

FIG. 1 is a side elevational view of the overall stuffing and conveying apparatus.

FIG. 2 is an enlarged side elevational view of the sausage contact means which is employed in the apparatus depicted in FIG. 1.

FIG. 3 is an exploded view of sausage contact means depicted in FIG. 2.

FIG. 4 is a vertical sectional view, taken along line 4—4 of FIG. 2.

FIG. 5 is a horizontal sectional view, taken along line 5—5 of FIG. 2.

FIG. 6 is a diagrammatic illustation of the sausage contact means, statistical analyzer, printer and printer energizing switch.

In summary, referring to FIG. 1 the present invention is generally employed in combination with a sausage stuffing appatatus 10 which forces a chopped or comminuted meat mixture into a casing 12 to form an elongated sausage 14 of substantially uniform cross-sectional shape and size. After the casing has been filled, the sausage is conducted, via horizontal conveyor 16, away from the sausage stuffing apparatus 10. In the illustrated embodiment, the sausage is eventually discharged onto a vertical conveyor 18 which carries the sausage to the next operation, such as cooking.

In accordance with the present invention, sausage contact means, generally at 20, is mounted at a position along the horizontal conveyor 16, so as to contact the surface of the sausage as the sausage is moved along by the conveyor, permitting the sausage diameter to be monitored. The sausage contact means is operatively connected to a statistical analyzer 22 which provides a visual numerical readout 24 of the amount by which the sausage diameters differ from a selected standard diameter. The analyzer further includes a printer 26 for recording the sausage diameters at a predetermined location.

In the present invention, the distance between the sausage contact means 20 and printer energizing switch 28 is approximately one-half the length of the sausage, so that the recorded diameter is approximately at the sausage mid-point.

Turning now to a more detailed description of the present invention, the sausage stuffing apparatus 10 is of the type generally well known in the industry. To make a sausage, the operator places the casing 12 over the stuffing horn (not shown). The meat mixture which comprises the sausage contents is forced through an in-feed pipe 32, through the stuffing horn and into the casing. As the mixture flows into the casing, the casing is moved away from the horn, As noted earlier, the force required to move the casing from the stuffing horn is determined by the friction between the casing and the stuffing horn. These sausage stuffing techniques are well known in the meat packing industry.

After the stuffing of the sausage is complete, the open end of the casing is closed, and the sausage proceeds along a conveyor 16a leading away from the stuffing apparatus. Downstream of the stuffing apparatus, air cylinder 34 is provided to push the sausage onto an adjacent parallel conveyor 16b. The parallel conveyor conducts the sausage through a water spray 36 which cleans the outside of the casing and then downstream to an off-loading position where the sausage is discharged onto vertical conveyor 18.

For contacting and monitoring the diameter as the sausage moves along the conveyor 16b, the sausage contact means 20 is mounted at a fixed position downstream of the water rinse 36. The sausage contact means (referring to FIG. 2) is mounted above the horizontal conveyor 16b by a support bracket 38. The sausage contact means 20 has a fixed element 40 attached to the support bracket 38 and an adjustable element 42 which is slidably mounted with respect to the fixed element 40, for adjustment toward or away from the conveyor. Both elements are preferably made of rigid plastic material which is compatible with food processing, although other materials also may be suitable.

FIG. 5, the fixed and adjustable elements are held together by spring-tensioned bolts 44 which extend through access slots 46 in the fixed element and threadedly engage the adjustable element 42. A compressed coil spring 48 extending between washer 50 and the head of each bolt 44, biases the bolts to hold the adjustable element 42 in close contact with the fixed element 40 while permitting vertical adjustment of element 42 within access slots 46.

To assure proper alignment the two elements 40 and 42, the adjustable element 42 has a raised vertical rib 52 on the inside surface which is slidably received in a matching shallow groove 54 on the inside surface of the fixed element 40. For adjusting the relative vertical position of the movable element 42, the movable element has a threaded follower 56 attached to the raised rib 52. The follower extends into a center slot 58 in the fixed element 40, through which a lead screw 60 extends. The lead screw is held in a fixed axial position in the stationary element 40 by a set screw 62 which extends into an annular groove 64 on the lead screw. Thus, rotation of the threaded lead screw precisely moves the follower 56 and the adjustable element 42 up or down relative to the fixed element 40.

For actually contacting the surface of a sausage (referring to FIGS. 3 and 4), a circular contact member 66 is mounted at the lower end of a push rod 68 which extends vertically through the adjustable element 42. The upper end of the push rod terminates immediately below a contact arm 70 of electronic gauge head 72. The circular contact member directly contacts the surface of the sausage, so that changes in diameter result in corresponding movement of the push rod which is sensed by the gauge head.

As best seen in FIGS. 4 and 5, with cover plate 73 removed, an oval center portion of the adjustable element 42 is hollowed out to permit assembly of the push rod as shown. The push rod is downwardly biased by a compressed coil spring 74 extending between the inside surface 76 of the hollowed-out area and sleeve 78 axially fixed on the push rod. Push rod sleeves 80 and 82 spaced on either side of the lower edge of the adjustable element 42 limit the upward and downward movement of the push rod to a distance D, which must be greater than the difference between the minimum and maximum preferred sausage diameters. The spring 74 biases the push rod to the bottom position, so that when no sausage is present, the display 24 on the statistical analyzer 22 is similar to that for a sausage which has a diameter smaller than the preferred range.

At one end of the push rod 68, the contact member 66 which contacts the sausage is a generally circular rigid plastic disc with curved lower edges to prevent snagging on the casing and to slide easily over the rounded butt ends of the sausages. At the other end of the push rod, the gauge head 72 is provided to detect minute movement of the push rod resulting from a change in sausage diameter. The gauge head may be of various commercially available devices which are designed to detect very small dimensional differences from a selected standard. One type of gauge head which is suitable for the present invention in Model No. EHE-1056 marketed by Federal Products Corporation of Chicago, Ill.

The preferred gauge head 72 is mounted on the side of movable element 42 by bolted attachment to bracket 75 and generates an electric signal responsive to very small changes in the push rod position, i.e., by changes in the sausage diameter, which is fed by electric lead 84 to the statistical analyzer 22. The statistical analyzer 22 is preferably also of a type which is commercially available, such as Model No. 711 from Federal Products Corporation of Chicago, Ill. The analyzer is preferably turned 90° from the position shown in FIG. 1, so that the analyzer faces the operator of the stuffing apparatus 10. On the face of the analyzer is the lighted numerical display 24 which provides the operator with a visual indication of the difference between the selected standard diameter and the sausage diameter being monitored at that instant. This display may be continuous, and may even vary throughout the length of a single sausage, if the diameter is not uniform.

An alarm condition may be provided in the form of a light 86 on the analyzer panel or a buzzer (not shown) to indicate that the sausage being monitored at that instant is out of tolerance, thereby signalling the operator to take corrective action.

In FIG. 6, to provide a production record, the analyzer 22 is used with a printer 26 for recording the diameter of sausages being stuffed. In accordance with the preferred embodiment, only the diameter in the middle of every fifth sausage is actually recorded. Of course, this may be varied to record the diameter more or less often than every fifth sausage, or at more than one location on each sausage, without departing from the present invention.

In the present invention, the printer is energized by switch 28 to print the difference in diameter being monitored at the particular instant when switch 28 closes. As described briefly above, switch 28 is located adjacent to the conveyor 16b so as to engage the end of a sausage approximately when the middle of the sausage is passing beneath the sausage contact means 20. Accordingly, the recorded difference from the standard, if any, is for the midpoint on the sausage, which is believed to be a fair representation of the diameter throughout the sausage. As with the alarm condition, the printer 26 also operates to specially identify on the printed tape, as by an asterisk, those sausages having diameters not falling within the preferred diameter range.

Although decribed in terms of a preferred embodiment, this invention can be embodied in various forms and, therefore, is to be construed and limited only by the scope of the appended claims.

I claim:

1. In a sausage making apparatus comprising means for stuffing sausage mixtures into casings and conveyor means for conducting stuffed sausages away from the stuffing means, the improvement comprising, in combination, means to detect any difference of the sausage diameters from a selected standard diameter, the means including:
    sausage contact means mounted adjacent the conveyor to contact the surface of a sausage moving along the conveyor;
    numerical display means operatively associated with the sausage contact means to display the amount by which the diameter of a sausage moving along the conveyor differs from the selected standard diameter;
    said sausage contact means including means to trigger the numerical display means to display the difference of a sausage diameter at a selected position along the sausage, wherein the trigger means includes an element positioned adjacent the conveyor a selected distance from the sausage contact means, said element being adapted to energize the numerical display means upon contact by the end of the sausage.

2. An apparatus in accordance with claim 1, further including a recorder operatively associated with the numerical display means; and said trigger means triggers the recorder to record the difference of a sauasge diameter at a selected position along the sausage.

3. In a sausage making apparatus comprising means for stuffing sausage mixtures into casings and conveyor means for conducting stuffed sausages away from the stufing means, the improvement comprising, in combination, means to detect any difference of the sausage diameters from a selected standard diameter, the means including:
    sausage contact means mounted adjacent the conveyor to contact the surface of a sausage moving along the conveyor;
    numerical display means operatively associated with the sausage contact means to display the amount by which the diameter of a sausage moving along the conveyor differs from the selected standard diameter;
    a recorder operatively associated with the numerical display means;
    means to trigger the recorder to record the difference of a sausage diameter at a selected position along the sausage, wherein the trigger means includes a switch positioned adjacent the conveyor a selected distance downstream of the sausage contact means, the switch being adapted to energize the recorder upon contact by the end of the sausage.

4. In a sausage making apparatus comprising means for stuffing sausage mixtures into casings and conveyor means for conducting stuffed sausages away from the stuffing means, the improvement comprising, in combination, means to detect any difference of the sausage diameters from a selected standard diameter, the means including:
    sausage contact means mounted adjacent the conveyor to contact the surface of a sausage moving along the conveyor;
    numerical display means operatively associated with the sausage contact means to display the amount by which the diameter of a sausage moving along the conveyor differs from the selected standard diameter; and
    wherein the sausage contact means includes a first element which is mounted in a fixed position relative to the conveyor and a second element adjustable toward and away from the conveyor, and a sausage contact member carried by the second element and biased to engage a sausage moving along the conveyor.

5. An apparatus in accordance with claim 4, wherein the sausage contact member is mounted on the end of a push-rod carried by the second element, the apparatus further comprising means cooperative with the numerical display means for generating an electrical signal responsive to the position of the push-rod.

6. An apparatus in accordance with claim 4, wherein the second element is slidably mounted with respect to the first element, a lead screw being carried by the first element in threaded engagement with the second element for adjusting the position of the second element.

7. An apparatus in accordance with claim 5, wherein the push-rod is spring-biased for the sausage contact member to engage the surface of a sausage disposed on the conveyor.

8. An apparatus in accordance with claim 3, wherein the selected distance is approximately one-half the length of a sausage so that the recorded diameter is at about the middle of the sausage.

9. An apparatus in accordance with claim 1, wherein the display means continuously displays the difference in diameter as a sausage moves past the sausage contact means.

10. A method for monitoring the difference of the diameter of sausages from a selected standard diameter, as the sausages are carried by a conveyor away from the sausage stuffing apparatus, the method comprising:
    contacting the surface of a sausage as the sausage moves along the conveyor with a sausage contact member which is mounted at a fixed position along the conveyor but is movable toward and away from the conveyor;
    detecting the change in position of the contact member as the sausage diameter differs;
    numerically displaying the difference between the sausage diameter and the selected standard diameter; and
    triggering said numerical displaying step, said triggering step including contacting an end of the sausage at a location along the conveyor that is spaced from the sausage contact member by a selected distance.

11. A method in accordance with claim 10, further comprising the step of selectively recording the amount of difference at a chosen position along a sausage.

12. A method in accordance with claim 10, wherein the difference is continuously displayed as the sausage moves past the sausage contact member.

13. A method in accordance with claim 10, wherein the sausage diameters are only periodically recorded.

14. A method in accordance with claim 10, further comprising providing an alarm condition if the difference between a sausage diameter and the selected standard diameter exceeds a chosen range.

15. A method in accordance with claim 10, wherein the selected distance is approximately one-half the length of a sausage so that the displayed diameter difference is at about the longitudinal center of the sausage.

16. In a sausage making apparatus comprising means for stuffing sausage mixtures into casings and conveyor means for conducting stuffed sausages away from the stuffing means, the improvement comprising, in combination, means to detect a difference of the sausage diameters from a selected standard diameter, the means including:

sausage contacting means mounted adjacent the conveyor to contact the surface of a sausage moving along the conveyor, wherein the sausage contact means includes an energizing switch mounted at a selected position along the conveyor and a sausage contact member mounted at a selected position along the conveyor that is spaced from said energizing switch, said sausage contact member being biased to engage a sausage moving along the conveyor; and numerical display means operatively associated with the sausage contact means to display the amount by which the diameter of a sausage moving along the conveyor differs from the selected standard diameter.

17. An apparatus in accordance with claim 1, wherein the selected distance is approximately one-half the length of a sausage so that the displayed diameter difference is at about the longitudinal middle of the sausage.

* * * * *

UNITED STATES PATENT AND TRADEMARK OFFICE
CERTIFICATE OF CORRECTION

PATENT NO. : 4,434,529
DATED : March 6, 1984
INVENTOR(S) : Ronald W. Jensen

It is certified that error appears in the above-identified patent and that said Letters Patent are hereby corrected as shown below:

In the References Cited, "Kupcikeviciw et al" should read --Kupcikevicius et al--.

In column 1, line 31, "analoguous" should read --analogous--.

In column 1, line 44, "standerd" should read --standard--.

In column 2, line 43, "appatatus" should read --apparatus--.

In column 3, line 37, insert --In-- before "FIG. 5".

In column 3, line 46, after "proper alignment" insert --between--.

In column 5, line 11, "decribed" should read --described--.

In column 5, line 48, "stufing" should read --stuffing--.

Signed and Sealed this

Second Day of October 1984

[SEAL]

Attest:

GERALD J. MOSSINGHOFF

Attesting Officer     Commissioner of Patents and Trademarks